Figure 1A:
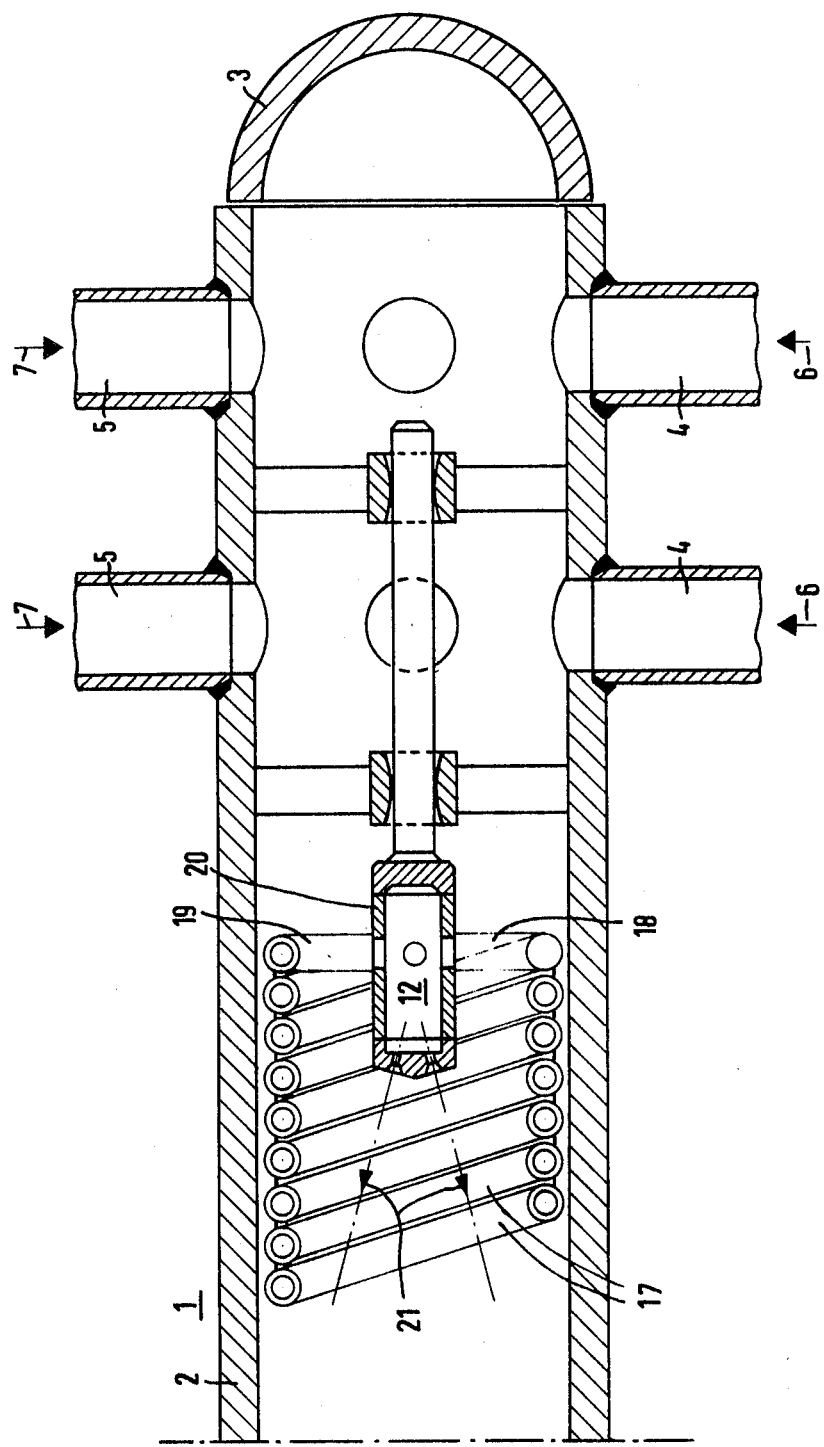

United States Patent

[11] 3,590,788

[72] Inventor Rupprecht Michel
Erlangen, Germany
[21] Appl. No. 824,561
[22] Filed May 14, 1969
[45] Patented July 6, 1971
[73] Assignee Siemens Aktiengesellschaft
Berlin and Munich, Germany
[32] Priority May 16, 1968
[33] Austria
[31] A 4730/68

[54] INJECTION COOLER FOR STEAM POWER PLANT
10 Claims, 3 Drawing Figs.
[52] U.S. Cl. ................................................ 122/487
[51] Int. Cl. ................................................ F22g 5/12
[50] Field of Search ........................................ 261/158-
—161; 122/31, 459, 479, 487

[56] References Cited
UNITED STATES PATENTS

| | | | |
|---|---|---|---|
| 1,141,956 | 6/1915 | Guthardt ..................... | 122/487 X |
| 2,155,986 | 4/1939 | Wheaton ..................... | 122/487 X |
| 2,908,255 | 10/1959 | Michel ......................... | 122/479 X |
| 3,111,936 | 11/1963 | Brunner ...................... | 122/479 |

FOREIGN PATENTS

| | | | |
|---|---|---|---|
| 117,943 | 12/1943 | Australia ..................... | 122/487 |

*Primary Examiner*—Kenneth W. Sprague
*Attorneys*—Curt M. Avery, Arthur E. Wilfond, Herbert L. Lerner and Daniel J. Tick

ABSTRACT: Injection cooler for steam power plants includes a substantially hollow tubular member having a steam inlet and traversable by cooling steam supplied thereto through the steam inlet, at least one nozzle located in the tubular member in the vicinity of the steam inlet, and passage means disposed along the inner surface of the tubular member for supplying injection water to the nozzle.

INJECTION COOLER FOR STEAM POWER PLANT

My invention relates to injection cooler for steam power plant, especially with a once-through boiler, wherein it is sought to increase the durability of the injection cooler and to improve the water injection so that trouble-free vaporization of the injected water occurs even during operation at varying pressure and very light loads.

The danger frequently arises in injection coolers that the regulability of injection valves may be impaired by sedimentary deposits in the regions of narrowest cross section in the valves. Such deposits occur especially when the injection water is removed from the boiler at a location where high working medium temperatures prevail, for example downstream of the high pressure regenerative preheater stages. It has been found that such deposits can be largely avoided if very cool injection water is used. Therefore, in addition to the disadvantage of a reduced thermal efficiency, the very grave disadvantage that cold water vaporizes much more poorly downstream of the injection nozzle and causes thermal stressing of the protective tube inserted in the injection cooler must be given due consideration.

The protective tube installed in the injection cooler would be repeatedly destroyed after a relatively short operating period when using cold injection water. A further disadvantage of the cooler injection water is that, especially during operation at varying pressure, complete vaporization of the injected under-cooled water is no longer assured, so that nonvaporized water distributes unevenly over the individual parallel strings of a connected tube system with consequent development of further difficulties.

It is accordingly an object of my invention to provide injection cooler for steam power plant which avoids the aforementioned disadvantages of the heretofore known injection coolers of this general type.

With the foregoing and other objects in view, I provide in accordance with my invention injection cooler for steam power plants comprising a substantially hollow tubular member having a steam inlet and traversable by cooling steam supplied thereto through the steam inlet, at least one nozzle located in the tubular member in the vicinity of the steam inlet, and passage means, such as channels, tube coils or similar pipe lines, are disposed along the inner surface of the tubular member for supplying injection water to the nozzle.

In accordance with further features of the invention, the passage means is of such construction that, on the one hand, injection water drawn from a location at which the working medium is at a low temperature is heated considerably and, on the other hand, a protective tube is formed in the injection cooler which cannot be destroyed by thermal stresses or shock effects.

In accordance with my invention, the injection cooler is operated with injection water at low temperature, and heating thereof is effected directly upstream of the injection nozzle before the water is injected. Consequently, the injection nozzle is at a location at which the prevailing temperature is not so high that depositions of magnetile or other undesired materials will occur thereat. Nevertheless, the injection water becomes heated to a sufficiently high temperature within the injection cooler so that desirably hot water or in fact steam-water mixture is sprayed from the injection nozzle and thereby assures troublefree vaporization of the injected working medium even when operating at varying pressure and at very low loads. Due to the fact that the protective tube of my invention is not formed with a conventionally smooth sheet metal casing but rather, depending upon the boiler capacity or output, is formed of a singly or multiply wound helical tube coil whose turns are welded together so that they are preferably steam-tight and constitute a cylinder casing having a wave-shaped surface, a very turbulent flow is produced therein, and additional vaporization of the water particles impinging on the surface of this protective tube is promoted.

In accordance with other features of my invention, the injection water flows through this singly or multiply wound helical tube coil and, when several parallel strings of these helical tube coils are present, can then be collected in an axially extending tube and subsequently discharged through lateral openings or nozzles. The injection water can thus be heated to approximately boiling temperature or, if necessary, so that it is partially vaporized. It is also conceivable that the water being injected be completely vaporized in this way with a suitably large heat exchanger whereby the same cooling effect is produced by equal quantities of water.

Since the tube coils installed in the steam cooler of my invention can only be of limited size for reasons of the price thereof, it is desirable, in accordance with a further feature of the invention, to conduct the injection water beforehand through a heating surface located for example between the economizer and the air preheater of the steam power plant, after the water is withdrawn from a location of the boiler upstream of the high pressure preheater stages. At the location of the heating surface, the flue gases have a temperature of 350° to 400° C. so that even when the quantity injected drops to zero, no danger to this heating surface occurs.

To improve the thermal efficiency of the injection cooler, in accordance with yet another feature of my invention, the injection water is preheated in a heat exchanger which, for example on the steam side thereof, is heated by a steam pipe connected to the inlet of an intermediate superheater of the steam power plant. Such a heat exchanger, in accordance with an additional feature of the invention, is installed in a starting expansion device of the boiler that is located at the intermediate superheater inlet.

Other features which are considered as characteristic for the invention are set forth in the appended claims.

Although the invention is illustrated and described herein as embodied in injection cooler for steam power plant, it is nevertheless not intended to be limited to the details shown, since various modifications and structural changes may be made therein without departing from the spirit of the invention and within the scope and range of equivalents of the claims.

Figure 1B:
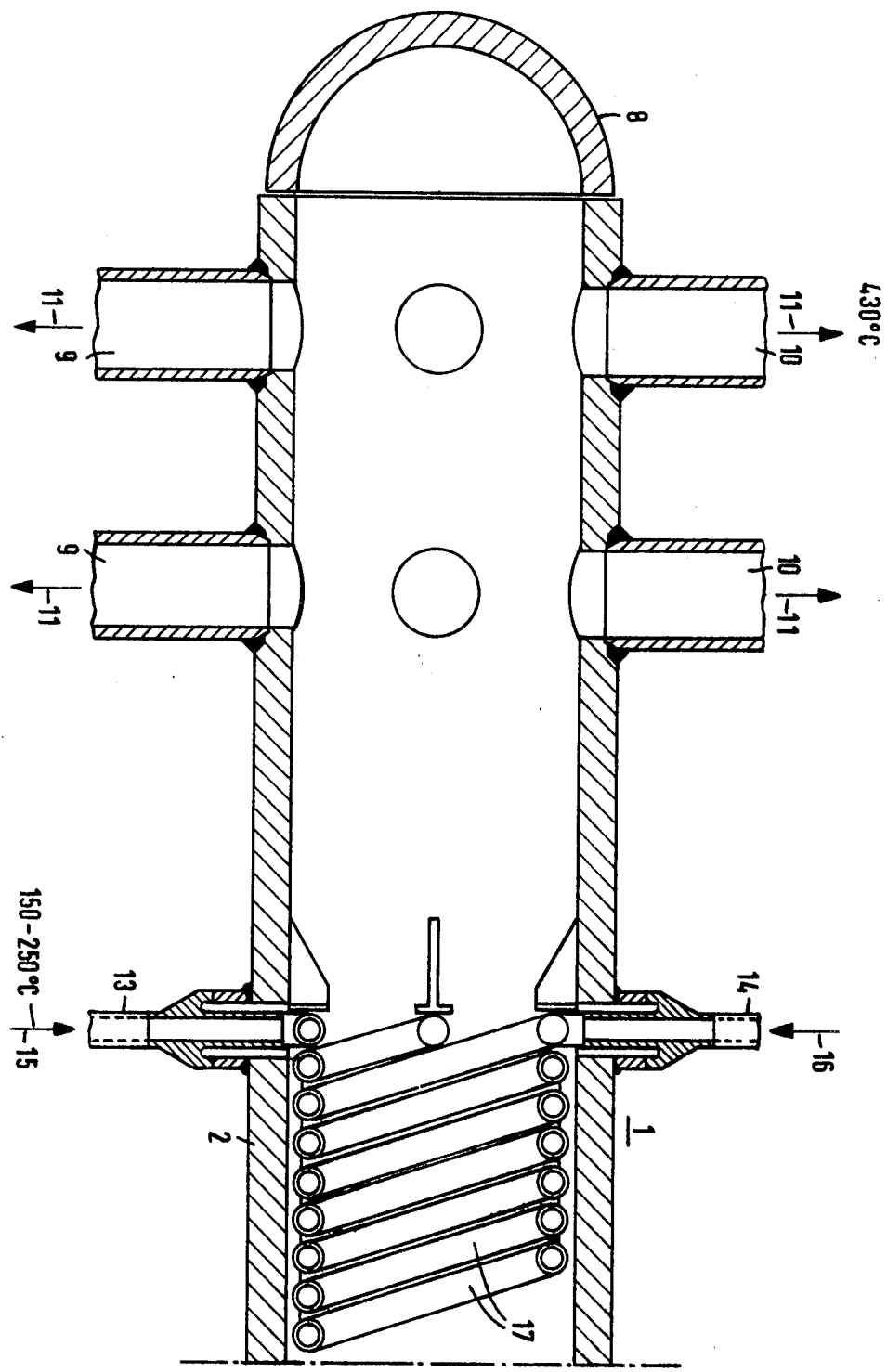
Figure 2:
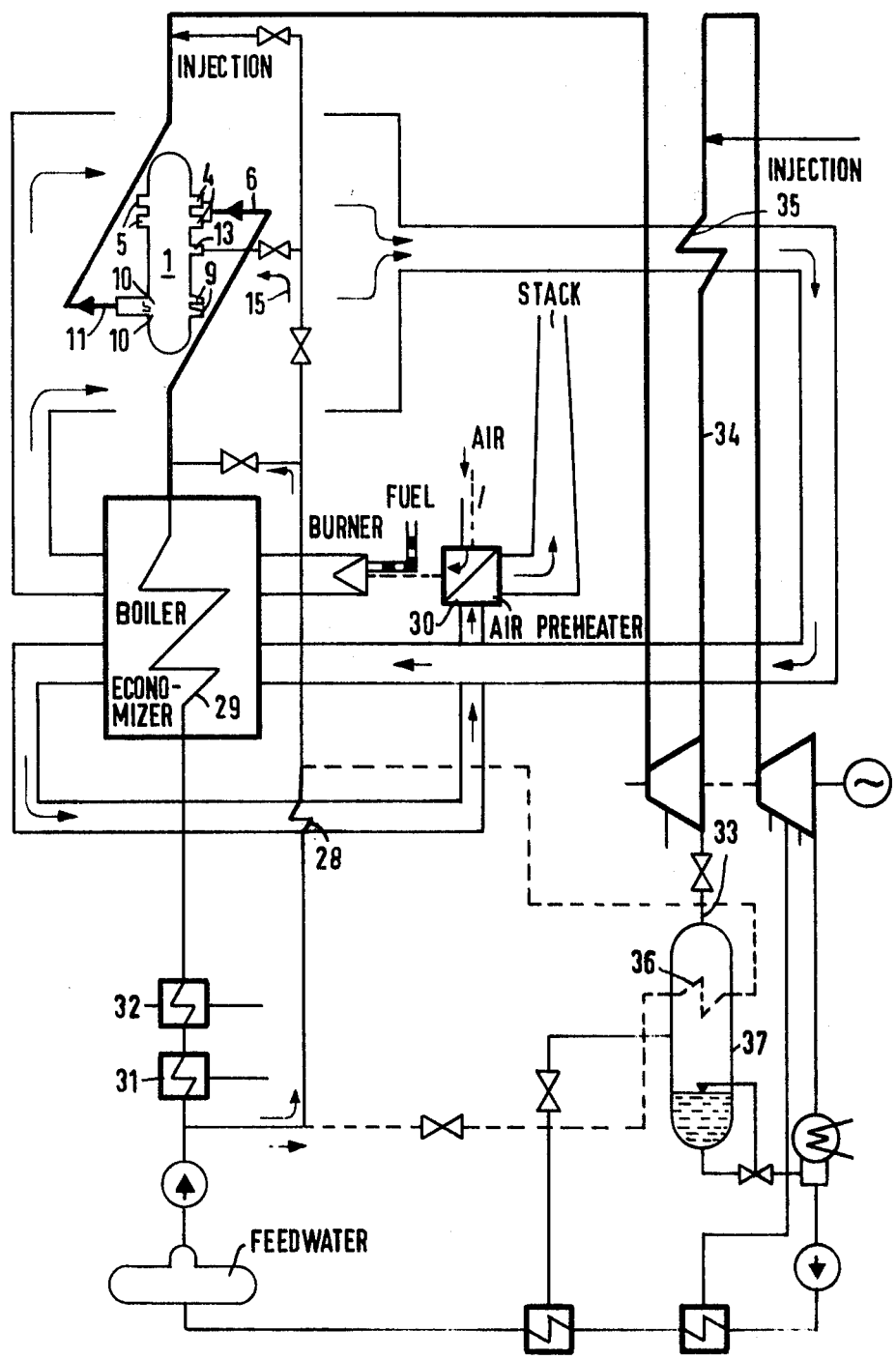

The construction and method of operation of the invention, however, together with additional objects and advantages thereof will be best understood from the following description of specific embodiments when read in connection with the accompanying drawings, in which FIGS. 1a and 1b are longitudinal sectional views of opposite ends of an injection cooler according to the invention;

FIG. 2 is a schematic view of a steam power plant incorporating the injection cooler of FIGS. 1a and 1b.

Referring now to FIGS. 1a and 1b of the drawing, there is shown an injection cooler 1 formed of a substantially tubular or rotationally symmetrical hollow member 2 which is traversed in downward direction, as viewed in FIGS. 1a and 1b, by cooling steam. An upper collector or manifold 3 at one end of the injection cooler 1 is formed with a number of inlet openings 4 and 5 through which steam having a temperature of 460° C., for example, flows in the direction of the arrows 6 and 7 from a parallel tube system shown schematically in FIG. 2. At the lower end of the injection cooler, there is provided a collector or manifold 8 which, acting as a distributor manifold, is formed with a number of outlet openings 9 and 10 from which the steam flows in the direction of the arrows 11 at a temperature of 430° C., for example, into a succeeding parallel tube system also shown schematically in FIG. 2. A nozzle assembly 12 located in the upper region of the injection cooler 1 serves for spraying coolant water into the hollow tube 2.

In the illustrated embodiment, injection water is initially delivered through several supply lines 13 and 14 at a temperature of 150° to 250° C., for example, in the direction of the arrows 15 and 16 into a multiply wound tube coil 17 and flows through this helical winding which is provided with outlet tubes 18 and 19. The injection water, which is heated in this way, is collected in an axially extending tube 20 and then discharges from the nozzle assembly 12 through lateral holes or nozzles in the direction of the arrows 21.

In order that the multiply wound tube coil 17 be capable of performing the function of a protective tube, the turns of the tube coil 17 are welded tightly together and form a closed cylinder casing. The cylinder casing has a more-or-less wave-shaped surface in accordance with the circular cross section of the tube turns 17. Vaporization of the injection water is improved even further thereby because the surface roughness of the protective sleeve produces a turbulence of flow which has a favorable effect on the vaporization.

As shown in the schematic view of the steam power plant of FIG. 2, preheated air and fuel are burned to heat a boiler supplied with feedwater for conversion to steam which is supplied at 460° C., to the injection cooler 1 through the inlets 4 and 5. The steam is exhausted from the injection cooler 1 through the outlets 9 and 10 and passed to a high pressure turbine stage. High pressure preheater stages 31 and 32 are located upstream of the boiler, and injection water is tapped from the supplied feedwater at a location upstream of the high pressure preheater stages 31 and 32 and conducted through a heating surface 28 before being injected into the steam supply upstream as well as downstream of the injection cooler 1. The heating surface 28 is located in the flue gas circuit between the economizer 29 and the air preheater 30 of the steam power plant. At the location of the heating surface 28, the flue gases have a temperature of 350 to 400° C. so that even when the quantity injected falls to zero, there is no danger to the heating surface.

The injection water, when improvement of the thermal efficiency of the injection cooler is desired, is preheated in a heat exchanger 36 which, for example on the steam side thereof, is heated by a steam pipe 33 connected to the inlet 34 of an intermediate superheater 35 located between the high and low pressure stages of the turbine. The heat exchanger 36 is shown installed in a starting expansion device 37 which is connected indirectly or directly to the intermediate superheater inlet.

I claim:

1. Injection cooler for steam power plants comprising a substantially hollow tubular member having a steam inlet and traversable by cooling steam supplied thereto through said steam inlet, at least one nozzle located in said tubular member in the vicinity of said steam inlet, and passage means disposed along the inner surface of said tubular member for supplying injection water to said nozzle, said passage means comprising en elongated tube formed so as to surround the cooling steam supplied through said inlet and to shield said inner surface of said tubular member therefrom.

2. Injection cooler according to claim 1, wherein said passage means is of such construction as to form a protective tube in the injection cooler whereby injection injection water drawn for a location of the steam power plant at which working medium is at a low temperature is heated in said passage means to a relatively high temperature without damage to said passage means due to thermal shock effects.

3. Injection cooler for steam power plants comprising a substantially hollow tubular member having a steam inlet and traversable by cooling steam supplied thereto through said steam inlet, at least one nozzle located in said tubular member in the vicinity of said steam inlet, and passage means disposed along the inner surface of said tubular member for supplying injection water to said nozzle, said passage means being of such construction as to form a protective tube in the injection cooler whereby injection water drawn for a location of the steam power plant at which working medium is at a low temperature is heated in said passage means to a relatively high temperature without damage to said passage means due to thermal shock effects, said passage means comprising a tube coil having the windings thereof welded to one another so as to form a steamtight, wave-shaped cylinder casing.

4. Injection cooler according to claim 3 wherein said tube coil is singly wound.

5. Injection cooler according to claim 3 wherein said tube coil is multiply wound.

6. Injection cooler according to claim 3 wherein said tube coil is of such dimensions that the injection water supplied therethrough to said nozzle is heated to a temperature at least approximating the boiling temperature thereof.

7. Injection cooler according to claim 3 in combination with a power plant comprising an economizer and an air heater having a heating surface therebetween, and high pressure regenerative preheater stages located upstream of said economizer, and wherein said injection water is supplied to said tube coil from a location upstream of said high pressure regenerative preheater stages of said steam power plant after passing through said heating surface located between said economizer and said air heater in said steam power plant.

8. Injection cooler according to claim 3 in combination with a power plant comprising an intermediate superheater, a heat exchanger heated by steam at the vicinity of said intermediate superheater, and high pressure regenerative preheater stages located upstream of said intermediate superheater, and wherein said injection water is supplied to said tube coil from a location upstream of said high pressure regenerative preheater stages of said steam power plant after passing through said heat exchanger heated by steam at the vicinity of said intermediate superheater of said steam power plant.

9. Injection cooler according to claim 8 wherein said heat exchanger is located in a starting vessel of the boiler in the steam power plant.

10. Injection cooler according to claim 8 wherein said heat exchanger is connected to a starting vessel of the boiler in the steam power plant.